(12) United States Patent
Stuetzler

(10) Patent No.: US 7,188,511 B2
(45) Date of Patent: *Mar. 13, 2007

(54) STRESS WAVE SENSOR

(75) Inventor: Frank-Juergen Stuetzler, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 112 days.

This patent is subject to a terminal disclaimer.

(21) Appl. No.: 10/866,386

(22) Filed: Jun. 11, 2004

(65) Prior Publication Data

US 2005/0275047 A1 Dec. 15, 2005

(51) Int. Cl.
*G01M 7/00* (2006.01)
(52) U.S. Cl. .................................................. 73/12.01
(58) Field of Classification Search ............... 73/12.01, 73/12.04, 862.26
See application file for complete search history.

(56) References Cited

U.S. PATENT DOCUMENTS

| | | | |
|---|---|---|---|
| 3,186,217 A * | 6/1965 | Pfann ............................ 73/777 |
| 4,125,820 A | 11/1978 | Marshall |
| 4,262,532 A | 4/1981 | Butler et al. |
| 4,511,877 A * | 4/1985 | Nishikawa et al. ............. 338/2 |
| 4,884,461 A | 12/1989 | Sawicki et al. |
| 4,966,034 A | 10/1990 | Bock et al. |
| 5,146,788 A | 9/1992 | Raynes |
| 5,220,838 A | 6/1993 | Fung et al. |
| 5,231,301 A | 7/1993 | Peterson et al. |
| 5,275,055 A | 1/1994 | Zook et al. |
| 5,351,549 A | 10/1994 | Baum et al. |
| 5,390,951 A * | 2/1995 | Iyoda ....................... 280/730.2 |
| 5,392,024 A | 2/1995 | Kiuchi et al. |
| 5,453,638 A | 9/1995 | Nagele et al. |
| 5,456,113 A | 10/1995 | Kwun et al. |
| 5,483,842 A | 1/1996 | Foreman |
| 5,544,716 A | 8/1996 | White |
| 5,566,974 A * | 10/1996 | Mazur et al. ............. 280/730.2 |
| 5,580,084 A * | 12/1996 | Gioutsos ....................... 280/735 |
| 5,613,571 A | 3/1997 | Rank et al. |
| 5,679,888 A | 10/1997 | Tohda et al. |
| 5,681,997 A | 10/1997 | McHale et al. |
| 5,684,336 A | 11/1997 | McCurdy |
| 5,748,075 A * | 5/1998 | Dirmeyer et al. ............ 340/436 |
| 5,760,313 A | 6/1998 | Guentner et al. |
| 5,767,766 A * | 6/1998 | Kwun .......................... 340/436 |

(Continued)

FOREIGN PATENT DOCUMENTS

| | | |
|---|---|---|
| EP | 0 139 370 | 5/1985 |
| EP | 0 482 487 | 4/1992 |
| EP | 0 590 292 | 4/1994 |

OTHER PUBLICATIONS robotics.e-symposium, Honeywell Sensing & Control; pp. 1-2; http://honeywell.robotics.e-symposium.com/components/index.html.

(Continued)

*Primary Examiner*—Max Noori
(74) *Attorney, Agent, or Firm*—Michael Best & Friedrich LLP

(57) ABSTRACT

Method and device for sensing stress waves. One embodiment is a method that includes providing a bendable support with one or more mounts each located at an end of the support; attaching a semiconductor element containing a plurality of piezoresistors, each having impedance, to the support; connecting the support to the component by the mounts of the support; and sensing the impedance of the plurality of piezoresistors.

24 Claims, 8 Drawing Sheets

U.S. PATENT DOCUMENTS

| | | |
|---|---|---|
| 5,786,744 A | 7/1998 | Nishio et al. |
| 5,793,005 A | 8/1998 | Kato |
| 5,834,646 A | 11/1998 | Kvisteroy et al. |
| 5,866,821 A | 2/1999 | Raynes |
| 5,873,597 A | 2/1999 | Sim |
| 6,009,970 A | 1/2000 | Breed |
| 6,023,664 A | 2/2000 | Bennet |
| 6,030,851 A | 2/2000 | Grandmont et al. |
| 6,032,092 A | 2/2000 | Laaser |
| 6,057,585 A * | 5/2000 | Shinogi et al. ............. 257/419 |
| 6,065,346 A * | 5/2000 | Voegele et al. ............... 73/754 |
| 6,070,113 A | 5/2000 | White et al. |
| 6,085,598 A | 7/2000 | Baba et al. |
| 6,169,479 B1 * | 1/2001 | Boran et al. ................ 340/436 |
| 6,203,060 B1 * | 3/2001 | Cech et al. .................. 280/735 |
| 6,234,519 B1 | 5/2001 | Breed |
| 6,256,563 B1 | 7/2001 | Blank et al. |
| 6,324,450 B1 | 11/2001 | Iwama |
| 6,407,660 B1 | 6/2002 | Bomya |
| 6,422,596 B1 | 7/2002 | Fendt et al. |
| 6,433,688 B1 | 8/2002 | Bomya |
| 6,466,849 B2 | 10/2002 | Kamiji et al. |
| 6,484,585 B1 | 11/2002 | Sittler et al. |
| 6,536,259 B2 * | 3/2003 | Mattes ..................... 73/12.09 |
| 6,583,616 B1 | 6/2003 | Bomya |
| 6,619,123 B2 | 9/2003 | Gianchandani et al. |
| 6,684,141 B2 | 1/2004 | Koors |
| 6,746,043 B2 * | 6/2004 | Ishida ........................ 280/735 |
| 6,898,498 B1 * | 5/2005 | Wessels et al. ............... 701/45 |
| 2002/0195807 A1 * | 12/2002 | Ishida ........................ 280/735 |
| 2005/0194240 A1 * | 9/2005 | Stuve ................... 200/61.45 M |

OTHER PUBLICATIONS

Hegeon Kwun; Back in Style: Magnetostrictive Sensors; Technology Today; Sep. 1991; pp. 1-8; Southwest Research Institute; http://www.swri.edu/3pubs/brochure/d17/magneto/magneto.htm.

Wobschall, Darold; Circuit Design for Electronic Instrumentation, Analog and Digital Devices from Sensor to Display, Second Edition; 1987; Chapter 6, Displacement Sensors, pp. 99-101; Chapter 7, Pressure and Forece Sensors, pp. 118-120; McGraw-Hill Book Company.

\* cited by examiner

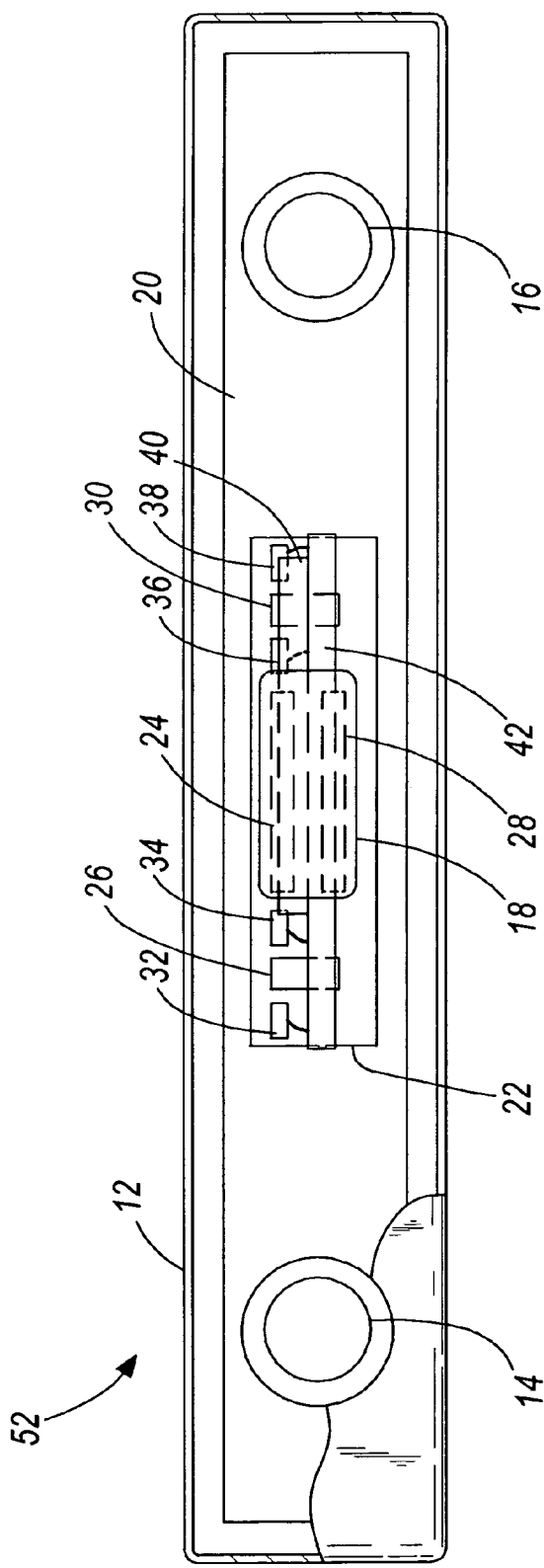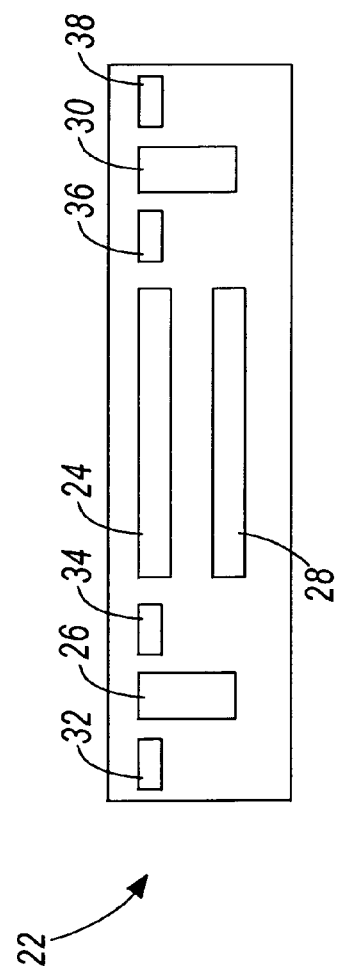

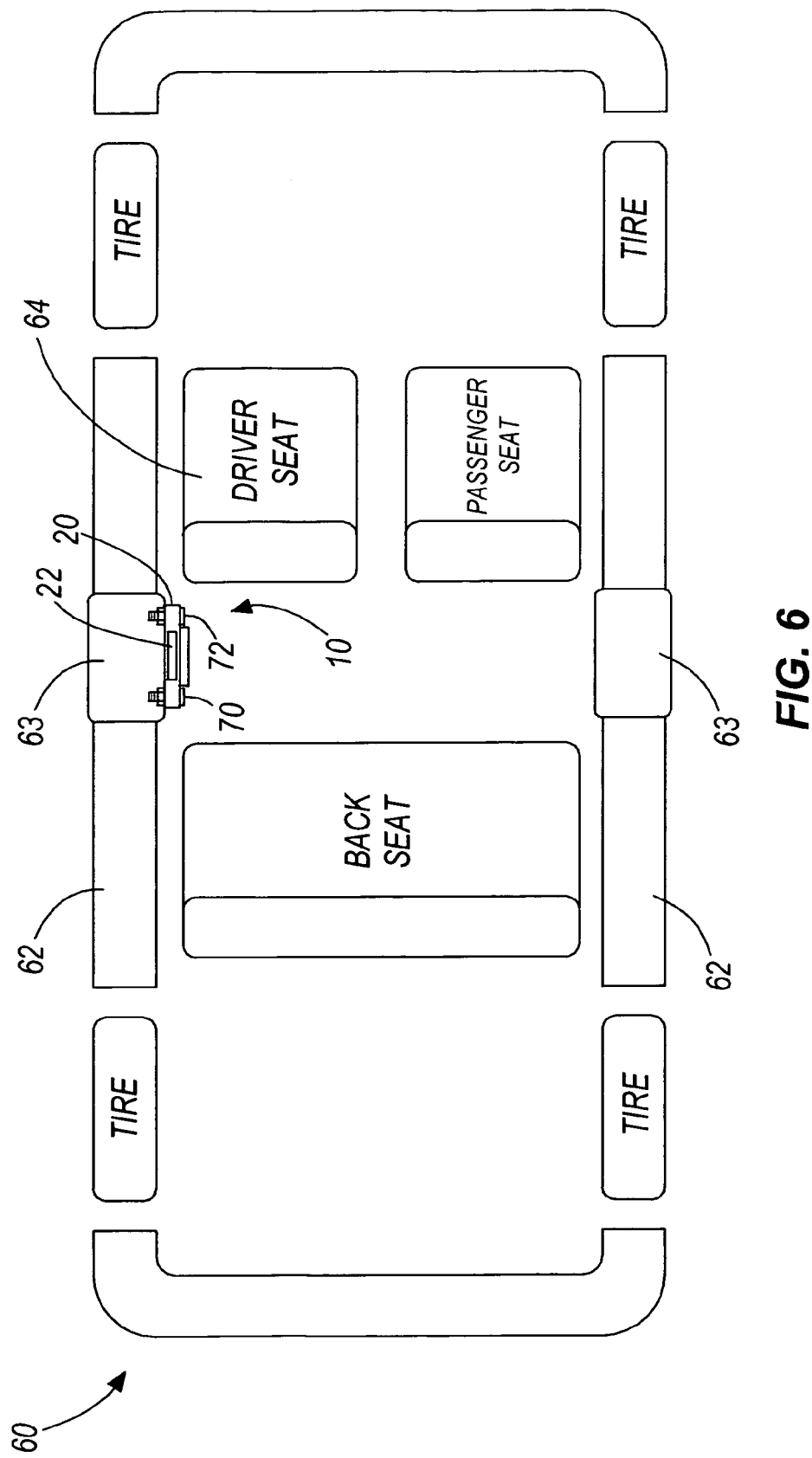

STRESS WAVE SENSOR

FIELD OF THE INVENTION

The present invention relates to sensing stress waves. More particularly, embodiments of the invention relate to detecting vehicle impact by sensing stress waves traveling through the structure of the vehicle.

BACKGROUND OF THE INVENTION

Vehicles are often equipped with impact sensors so that air bags and other safety restraints can be triggered, and triggered in accordance with the characteristics of the crash, during an accident. Most sensors, however, can only sense impact within a close proximity of the sensor. Safety sensor systems often include numerous accelerometers and/or door cavity pressure sensors separately or in combination. Numerous sensors are often employed since a sensor must be directly hit during an accident in order to detect impact. The sensors are often placed where impacts are common. Even though multiple sensors are used in detection systems, certain types of impacts are still difficult for the systems to identify. Impacts with narrow objects such as poles often pose a challenge for detection systems unless the pole directly hits a sensor. The odds of such an occurrence are relatively low and safety mechanisms often do not function properly during such collisions. The more sensors vehicle manufactures mount along or throughout a vehicle, the higher the associated cost. Unless sensors completely cover a side of a vehicle, the chance that an accident will be missed by the detection system still exists.

SUMMARY OF THE INVENTION

It is in the best interest of both vehicle passengers and vehicle manufactures to develop an impact detection system that functions accurately without imposing a high cost to vehicle manufactures and vehicle consumers. Accordingly, there is a need to provide sensors that can correctly detect an impact without having to be physically close to the point of contact.

In one embodiment, the invention provides a sensor that can measure the strain waves or stress waves traveling through a vehicle structure caused by deformation of the structure due to impact in a crash. The sensor is mounted onto a suitable vehicle structure, for example, the B-pillar of the vehicle or a reinforcing beam inside the door of the vehicle. The range of the sensor is adequate to allow only a single sensor to be placed along each side of a vehicle. The sensor includes a sensitive support that distorts when stress waves travel through it. A semiconductor element is mounted on the support such that it is distorted with the support. The semiconductor element, e.g., a silicon beam, may contain piezoresistors arranged in a Wheatstone-bridge configuration. The impedance of the piezoresistors changes as the physical characteristics of the attached support change. The sensor also contains a circuit capable of sensing the impedance of the piezoresistors. The change of the sensed impedance can be used to detect stress waves. By detecting the stress waves caused by impact and not the direct impact itself, the sensor can detect impacts that occur remotely from the location of the sensor.

In other embodiments, the stress wave sensor can be used to observe stress waves in other structures besides a vehicle structure. The sensor could be used to monitor stress applied to building or bridges or other compositions where unchecked stress strain can cause safety concerns. Any substance supporting the propagation of stress or force waves could be attached to the disclosed stress wave sensor. The material of the support contained within the sensor as well as the piezoresistant material used in the piezoresistors and semiconductor element can also be varied to create a specific sensor for specific types of stress waves.

Other features and advantages of the invention will become apparent to those skilled in the art upon review of the detailed description, claims, and drawings.

BRIEF DESCRIPTION OF THE DRAWINGS

In the drawings:

FIG. 4 is a front view of the second exemplary illustrated in FIG. 3.

FIG. 5 is a schematic illustration of a semiconductor element suitable for use in the embodiments illustrated in FIGS. 1–3.

FIG. 6 is a top-view illustration of the sensor of FIG. 1 mounted to a vehicle structure.

Figure 1:
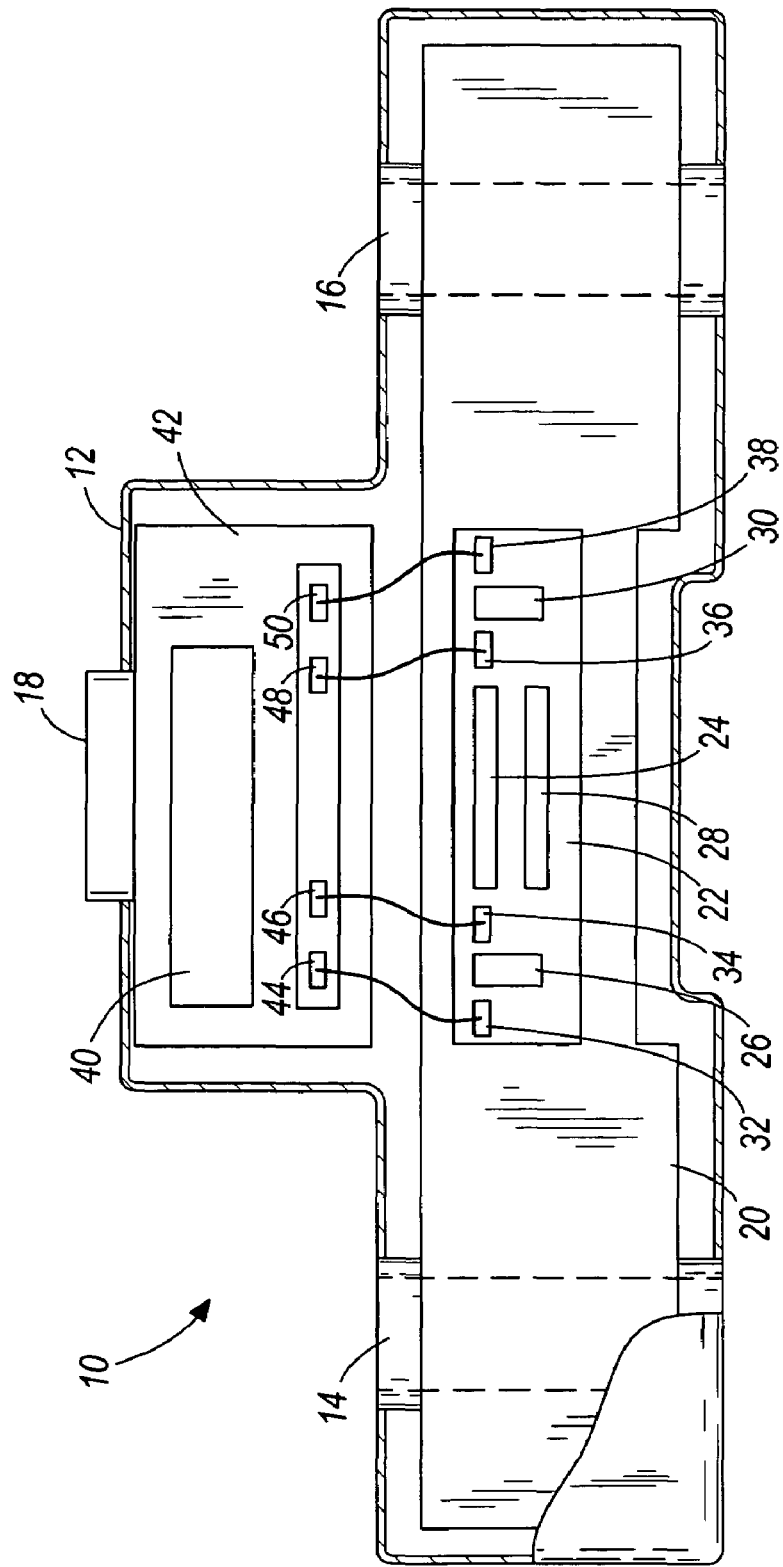
FIG. 1 is a top view of one exemplary embodiment of the invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates an exemplary sensor 10. The sensor 10 includes a housing 12 that encases the components of the sensor. The housing 12 provides the sensor 10 with shielding from dust and debris and other environmental hazards that may interfere with the functioning of the sensor 10. The sensor 10 also includes two mounts 14, 16 protruding out of the housing 12. The mounts 14, 16 provide a mechanism to allow the sensor 10 to be mounted onto a component or structure requiring stress monitoring such as the frame of a vehicle. The mounts 14, 16 are used as an interface to the component or structure so that any stress waves traveling through the component are transmitted to the sensor 10. The mounts 14, 16 of the sensor 10 could be attached to a metal frame of a vehicle or a supporting beam of a building. Alternatively, the mounts 14, 16 could be studs capable of attaching to a component with screws or bolts. The sensor 10 also includes a connector 18 that may be used to transmit sensor measurements to other control units that may activate devices or mechanisms based upon the data collected by the sensor.

Located inside the housing 12 is a support 20. The support 20 contains the two mounts 14, 16 and, in the embodiment, is constructed with each mount on one end of the support causing the support 20 to behave like a tuning fork. The two mounts 14, 16 act as tines of a tuning fork that are susceptible to stress waves, or vibrations. Stress waves or vibrations traveling through the beam or structure to which the sensor 10 is attached are forwarded to the support 20 through the mounts 14, 16.

The stress waves or vibrations cause the support to vibrate and distort. The support 20 is made from a flexible material or substance that is sensitive to stress waves. Aluminum, for example, may be used since it is light and flexible. The support 20 could also be constructed from steel or even high strength plastic. The thickness and composition of the support 20 determine the degree to which the support 20 distorts and, ultimately, the sensitivity of the sensor 10. The support may also contain more or less mounts placed in various configurations, other than at the ends of the support in order to facilitate the distorting of the support 20. For example, a circular support could be provided with three, four, or more mounts that may be attached to more than one beam or structure. Each mount will transmit stress waves from the beam or structure, which it is attached to, to the circular support.

The support 20 also serves as a foundation for a semiconductor element 22. The semiconductor element 22 is attached to the support 20 such that the support 20 transfers any distortions caused by stress waves traveling through the support 20 to the semiconductor element 22. Just as the support 20 is flexible in order to distort due to the propagation of stress waves, the semiconductor element 22 has similar flexibility. The semiconductor element 22 is attached along a surface of the support 20. In one embodiment, the semiconductor element 22 is attached flat to the surface of the support 20 so that the semiconductor element 22 will distort as the support 20 does.

The semiconductor element 22 includes piezoresistors 24, 26, 28, and 30. The piezoresistors 24, 26, 28, and 30 are arranged in a Wheatstone-bridge configuration. The piezoresistors 24, 26, 28, and 30 are constructed with a material whose resistivity is influenced by the mechanical stress applied to the material such as piezoreistant material. Examples of piezoresistant materials include, but are not limited to, silicon, polycrystalline silicon, silica glass, zinc oxide, and germanium. In one embodiment, the piezoresistors 24, 26, 28, and 30 are divided into two categories. The piezoresistors 24 and 28 are used as sensing piezoresistors and are arranged horizontally along the major or longitudinal axis of the semiconductor element 22. The piezoresistors 26 and 30 are used as reference piezoresistors, are smaller, and are arranged vertically or along the width of the semiconductor element 20. The reference piezoresistors 26 and 30 have less impedance than the sensing piezoresistors 24 and 28. The physical arrangement and characteristics of the two categories of piezoresistors make the sensing piezoresistors 24 and 28 more sensitive than the reference piezoresistors 26 and 30 to distortions of the semiconductor element 22 since they cover an area of the semiconductor element 22 that is more likely to distort in response to a stress wave passing through the support 20. The reference piezoresistors 26 and 30 are less sensitive to the distortions of the semiconductor element 22 since they cover less area of the semiconductor element 22 and are arranged closer to the ends of the support 20 where the support 20 distorts less. When the support 20 and the attached semiconductor element 22 are distorted by stress waves, the impedance of the sensing piezoresistors 24 and 28 will change more than the impedance of the reference piezoresistors 26 and 30. The difference between the changes of impedance of the two categories of piezoresistors can also be used to further estimate the characteristics of the impact or stress on the component that the sensor 10 is attached to.

The semiconductor element 22 also contains input and output terminals 32, 34, 36, and 38. The input and output terminals 32, 34, 36, and 38 are used to apply and measure voltage and/or current passing through the piezoresistors 24, 26, 28, and 30. The applied voltage and measured current can be used to calculate resistance by Ohm's law:

$$V = IR$$

where V represents the voltage applied to the circuit, I represents the current measured from the circuit, and R represents the resistance of the circuit.

The support 20 may also be constructed from a semiconductor material and may directly contain the piezoresistors 24, 26, 28, 30 rather than a separate semiconductor element 22 attached to the support 20. Any distortion of the semiconductor support created by stress waves traveling through the attached structure also causes the material of the embedded piezoresistors to distort. The semiconductor support may also contain input/output terminals used to apply and transmit voltage and/or charge flowing through the semiconductor support.

Applying voltage, measuring current, and calculating resistance can all be performed by a processor such as an application specific integrated circuit ("ASIC") 40 attached to the semiconductor element 22. The ASIC 40 is shown as being attached to a printed circuit board ("PCB") 42 through the input and output terminals 44, 46, 48, and 50. Other connections and even other calculating mechanisms may be used. For example, a chip or microprocessor could also replace the ASIC 40. The ASIC 40 could also be eliminated from the sensor and the output and input terminals 32, 34, 36, and 38 of the semiconductor element 22 could be directly coupled to the connector 18. By directly coupling the semiconductor element 22 to the connector 18 the processing of the measurements taken by the sensor (i.e., the calculating of resistance) could be carried out outside of the sensor at a remote control unit. The connector 18 may provide amplification or filtering to improve the characteristics of any data sent from the sensor or received by the sensor, for example current or voltage values, but the connector 18 does not process the data in order to deduce the meaning of the data such as to what degree the support 20 is stressed and distorted. The ASIC 40 may also act as a relay or amplifier for a sensed current measurement based on a constant application of voltage. The ASIC 40 could also process the sensed current of the piezoresistor arrangement and calculate a change in resistance, which could be used to further calculate a degree of stress applied to the support.

Figure 2:
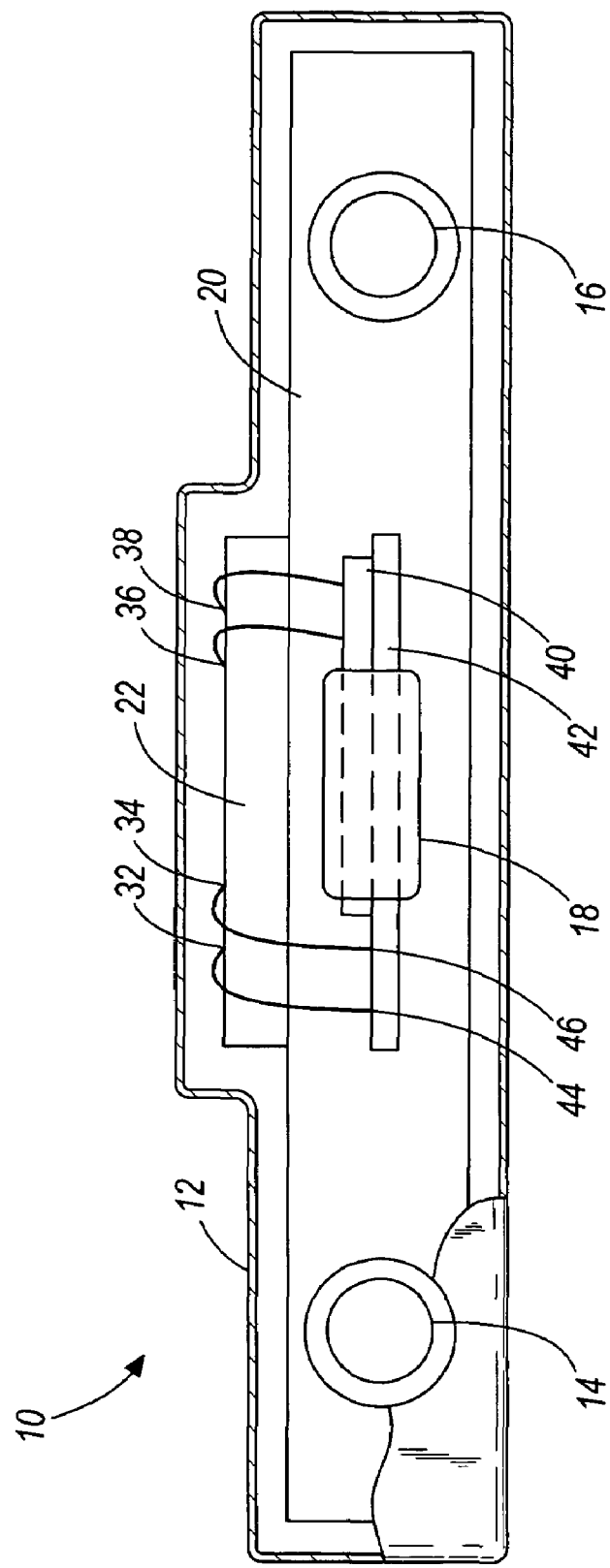
FIG. 2 is a front view of the exemplary embodiment illustrated in FIG. 1.

FIG. 2 illustrates the sensor 10 of FIG. 1 from a front view. The connector 18, shown with solid lines, is protruding toward the viewer. Two ends of the two mounts 14 and 16 are also protruding toward the viewer. The PCB 42 and attached ASIC 40 and the semiconductor element 22 are also displayed in phantom lines situated beneath the connector 18. The input and output terminals 44 and 46 (input and output terminals 48 and 50 are hidden behind the ASIC 40) of the PCB 42 and the input and output terminals 32, 34, 36, and 38 of the semiconductor element 22 are also shown in phantom lines along with the support 20 and the two mounts 14 and 16.

Figure 3:
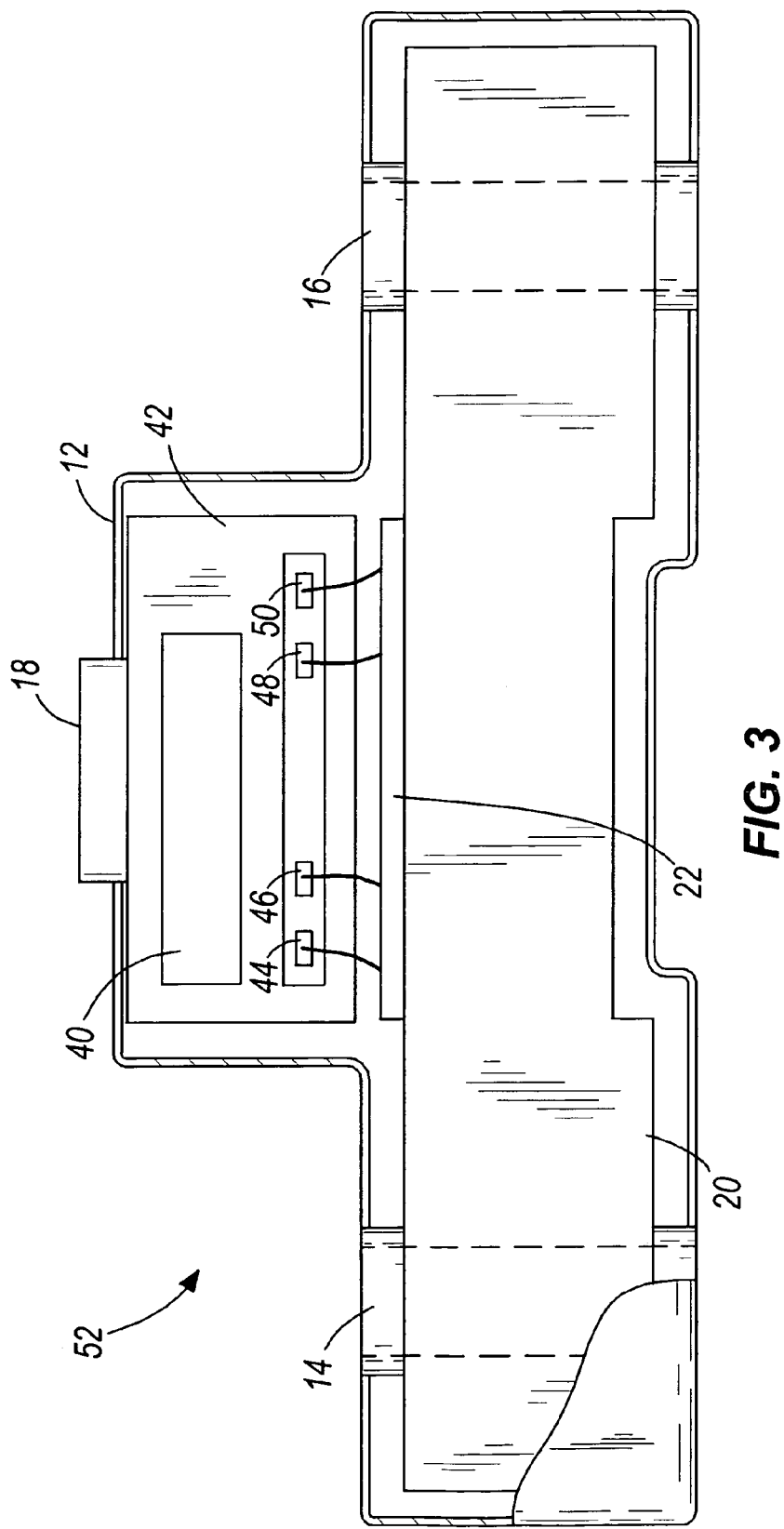
FIG. 3 is a top view of a second exemplary embodiment of the invention.

FIG. 3 illustrates a second exemplary sensor 52 from a top view. The sensor 52 contains all of same components as the sensor 10, but the semiconductor element 22 is not located on the top surface of the support 20. As can be seen in FIG. 3, the semiconductor element 22 is attached along the front edge of the support 20. The surface of the semiconductor element 22 containing the piezoresistors is positioned at a right angle to the ASIC 40 and PCB 42 rather than positioned parallel to the ASIC 40 and PCB 42 as in the sensor 10. Similarly, the semiconductor element 22 may be placed on the back surface or edge of the support 22. The semiconductor element's 22 location can be varied to adjust the functionality of the sensor. The semiconductor element's 22 position can also be varied to change the size and dimensions of the sensor 52. For example, placing the semiconductor element 22 on the front edge of the support 20 reduces the thickness of the sensor 10. The semiconductor element 22 may also be placed in a location where it can be easily replaced or tested if needed.

FIG. 4 illustrates the sensor 52 from a front view. Since the semiconductor element 22 is positioned along the front edge of the support 20 the piezoresistors 24, 26, 28, and 30 contained within the semiconductor element 22 are seen when the sensor 52 is viewed from the front. When viewed from the front the ASIC 40 and PCB 42 hinder the full view of the semiconductor element 22 since the semiconductor element 22 is positioned in a plane perpendicular to the plan containing the ASIC 40 and PCB 42. The connector 18 is shown in phantom lines and is protruding toward the viewer.

FIG. 5 illustrates the semiconductor element 22 displayed in FIGS. 1–4. The semiconductor element 22 contains the four piezoresistors 24, 26, 28, and 30 as well as the input and output terminals 32, 34, 36, and 38. As mentioned above, the sensing piezoresistors 24 and 28 are arranged length-wise in the middle of the semiconductor element 22. Their position makes them more sensitive to distortions of the semiconductor element 22 than the reference piezoresistors 26 and 30 since they cover an area of the semiconductor element 22 that is more likely to distort in response to stress waves. The reference piezoresistors 26 and 30 are less sensitive to the distortions of the semiconductor element 22 since they cover less area of the semiconductor element 22 and are arranged closer to the ends of the support 20 where the support 20 distorts less. The reference piezoresistors 26 and 30 may have higher impedance than the sensing piezoresistors 24 and 28. Other constructions are also possible. All four resistors may have identical impedance or their impedance may be further varied to better utilize and categorize a reading from the sensor. Each terminal 32, 34, 36, and 38 of the semiconductor element 22 may have a designated data flow such as input only or output only or both may be bi-directional. The input and output terminals 32, 34, 36, and 38 may be configured to be coupled to a variety of devices including a PCB, a microprocessor, or a connector.

FIG. 6 illustrates the sensor 10 shown in FIGS. 1 and 2 mounted in a vehicle 60. The sensor 10 and the components of the vehicle 60 are not drawn to scale. For the sake of clarity, the sensor 10 is illustrated without the housing 12, the connected ASIC 40 and PCB 42, and the connector 18. The vehicle 60 contains a side sill 62 and a B-pillar 63 on each side. The side sills 62 are positioned parallel to the ground surface that the vehicle 60 travels on and supports the side doors and windows. The B-pillars 63 are attached to the side sills 62 and protrude upward toward the roof of the vehicle 60. The B-pillars 63 may connect along the roof of the vehicle or the may simply extend and connect to the roof. The sensor 10 is shown mounted on a B-pillar 63. A single sensor 10 is shown mounted to the side of the vehicle 60 located next to a driver seat 64 for illustration purposes only. In practical use, each side of the vehicle 60 may include a sensor 10. The sensor 10 may also be mounted to other structures of the vehicle 60 capable of transmitting stress waves such as the side sills 62, roof, or other supporting frames. The mounts 14 and 16 are connected to the B-pillar 63 with screws 70, 72. As indicated earlier, the screws 70, 72 could be replaced with bolts, brackets, or any other fastener. The mounts 14, 16 could also be soldered or welded to the B-pillar 63. Other constructions are also possible depending on the composition and position of the mounts 14 and 16 and the structure to which the mounts 14, 16 are attached.

Once the sensor 10 has been attached to the B-pillar 63, any stress waves traveling through the B-pillar 63 are transmitted to the sensor 10. Stress waves travel from the B-pillar 63 and through the mounts 14 and 16 to the support 20. The support 20 distorts according to the amplitude, frequency, or other characteristic of the stress waves, which also causes the semiconductor element 22 attached to the support 20 to distort. The distortion of the semiconductor element 22 in turn causes the resistance of the piezoresistors 24, 26, 28, 30 to change. The change in the resistance of the piezoresistors 24, 26, 28, 30 can be processed by the ASIC or other processing device to monitor stress present in the B-pillar 63 of the vehicle 60. Changes in the resistance in the piezoresistors can indicate a collision or accident that may require the activation of safety restraint devices such as seatbelts or airbags.

Figure 7:
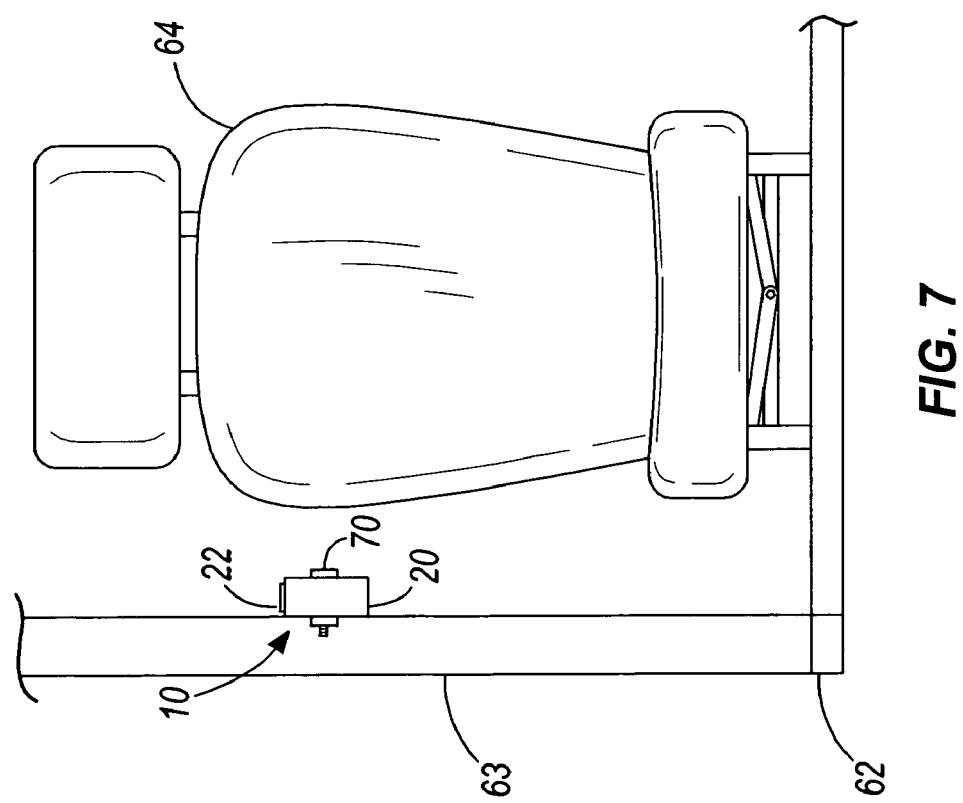
FIG. 7 is a rear-view illustration of the sensor of FIG. 1 mounted to a vehicle structure.

FIG. 7 illustrates the sensor 10 mounted to a B-pillar 63 of a vehicle 60 from a rear view. The side sill 62 is shown supporting the B-pillar 63 that is positioned parallel and adjacent to the driver seat 64. The sensor 10 is illustrated mounted to the B-pillar 63 with the screw 70. Another screw may be used to mount the other end of the sensor to the B-pillar 63 although it is not shown.

Figure 8:
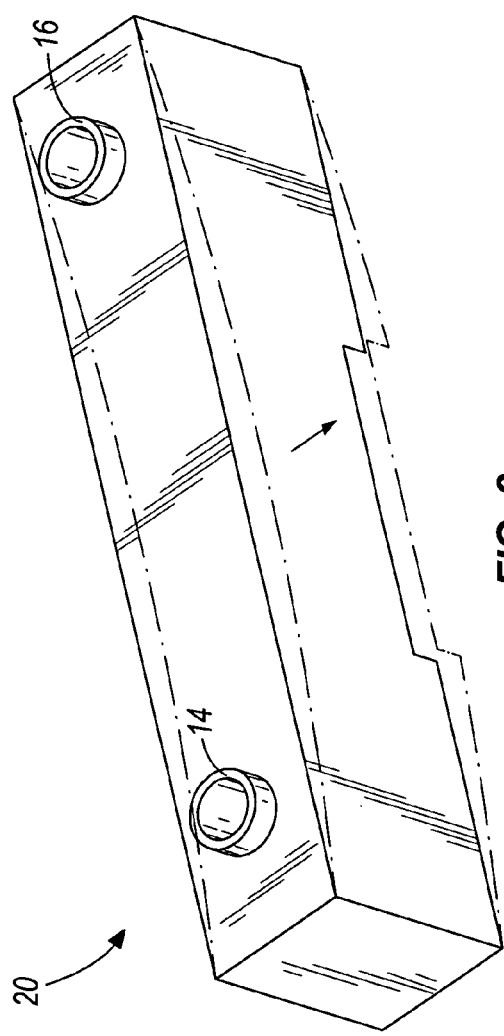
FIGS. 8 and 9 illustrate exemplary directions of bending of the support of the sensor of FIG. 1 due to stress waves traveling through it.
Figure 9:
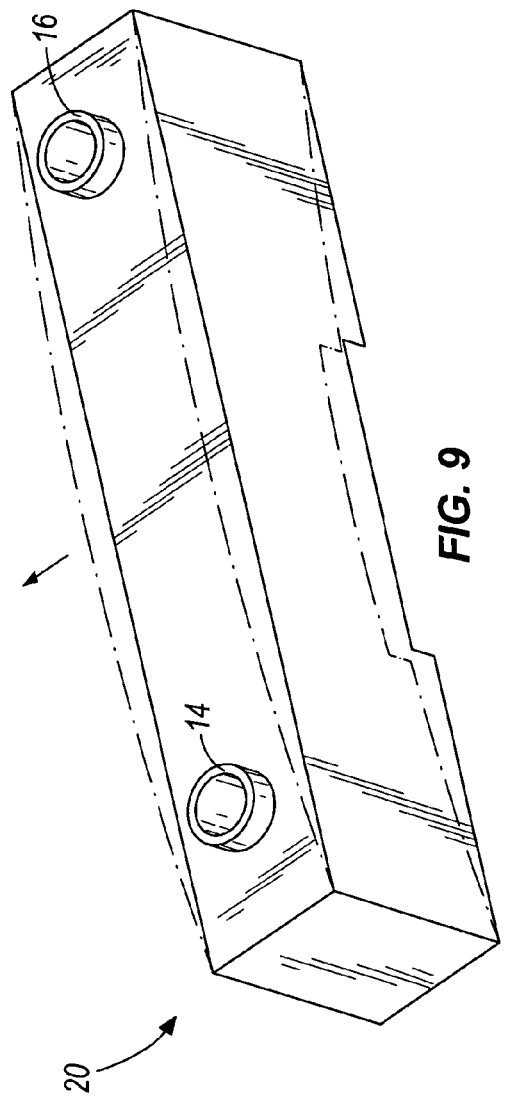

FIGS. 8–9 illustrates the support 20 of the sensor 10 distorted due to stress waves. The dashed lined illustrates the support 20 distorted from its original position shown in solid lines. For purpose of illustration the support 20 is shown without the housing 12, the semiconductor element 22, the ASIC 40 and PCB 42, and connector 18. The stress waves cause the support 20 to distort into a U-shaped beam either upward toward the top of the sensor 10 or downward toward the bottom of the sensor 10.

Figure 10:
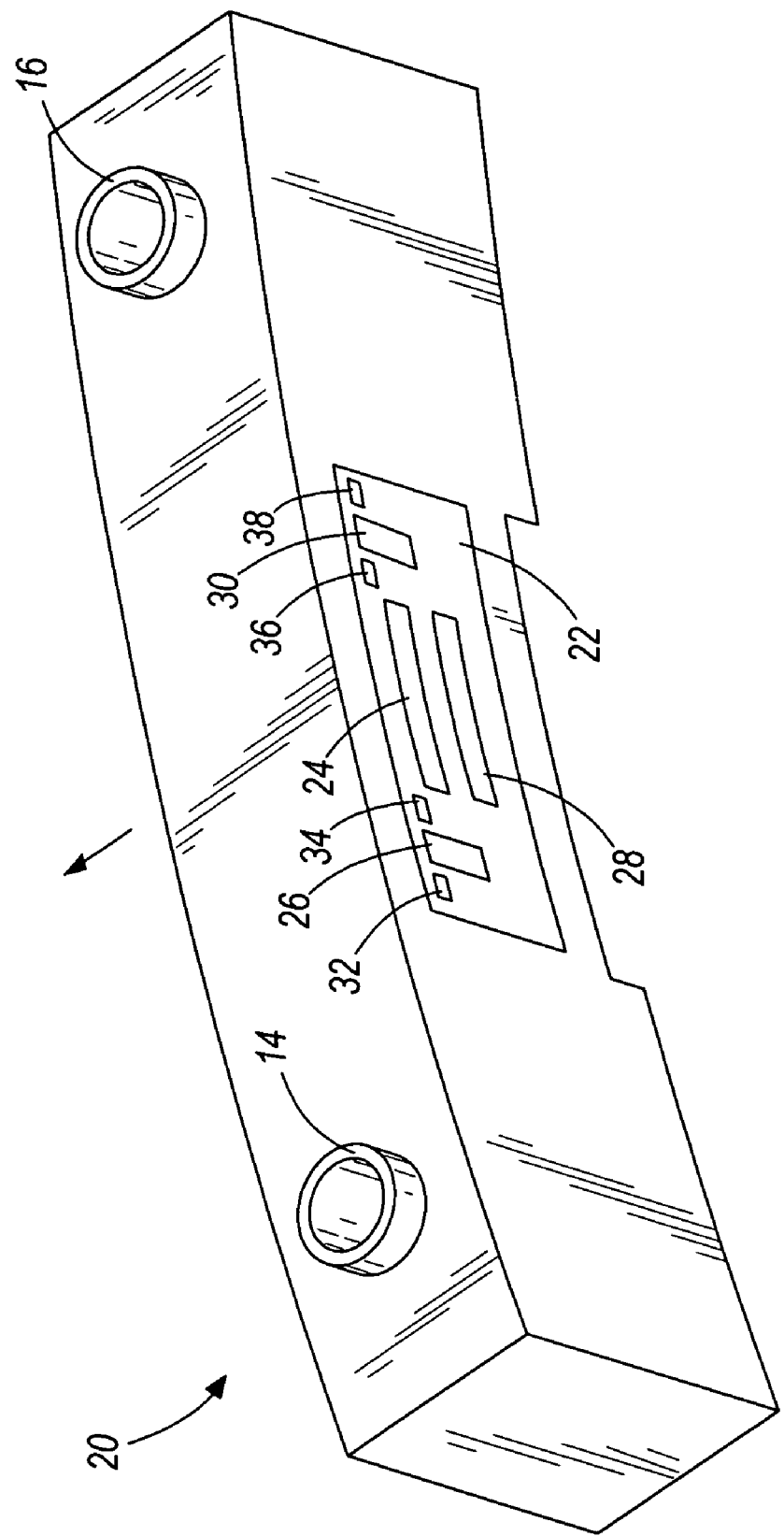
FIG. 10 illustrates the support and semiconductor element of the sensor of FIG. 1 bending due to stress waves traveling through it.

Referring to FIG. 10, as the support 20 distorts so does the attached semiconductor element 22. The semiconductor element 22 contains the piezoresistors 24, 26, 28, and 30 that also distort with the semiconductor element 22. As shown in FIG. 10, the sensing piezoresistors 24, 28 are distorted more than the reference piezoresistors 26, 30 due to there position and size. Since the support 20 bends length-wise into a U-shape, the sensing piezoresistors 24, 28 are distorted while the reference piezoresistors 26, 30 do not. As sensing piezoresistors 24 and 28 distort, their associated impedance changes due to the physical change of the material of the sensing piezoresistors 24 and 28. The ASIC 40 (not shown) can monitor the change of impedance of the sensing piezoresistors 24 and 28 so that the proper safety mechanisms may be activated when appropriate.

In the case of an accident at any point along a side of the vehicle, the impact of the accident causes stress waves to propagate through the vehicle structure 50 and to the attached sensor 10. If the structure of the vehicle is integral or unitary, a single sensor can be used to sense impact anywhere along the vehicle. It may be desirable, however, to place a sensor along each side of the vehicle to reduce the travel distance and, therefore, the travel time of the stress waves. Such a configuration also increases the reaction time of the system. Using a sensor on each side of a vehicle also increases the sensitivity and accuracy of the sensor since the stress waves travel a shorter distance decreasing the amount of time and substance the stress wave travels through that may dissipate certain characteristics of the waves.

The support 20 returns to its original shape after the stress waves have passed through it. In severe accidents or collision the support 20 may be distorted to a point where it retains its distorted shape. In this case, the accident would likely cause damage to the vehicle where it would require repair before it could be used again. The sensor would also need to be repaired in this situation.

Various features and advantages of the invention are set forth in the following claims.

The invention claimed is:

1. A stress wave sensor comprising:
   a support containing one or more mounts;
   a semiconductor element mounted to the support between the mounts and containing a plurality of piezoresistors, each of the plurality of piezoresistors having input and output terminals, the plurality of piezoresistors including sensing piezoresistors and reference piezoresistors, each of the sensing piezoresistors having a non-strained impedance that is different than a non-strained impedance of each of the reference piezoresistors; and
   a circuit configured to be coupled to the input and output terminals of the plurality of piezoresistors and capable of sensing the impedance of the plurality of piezoresistors.

2. The stress wave sensor of claim 1, wherein the support is configured to receive stress waves.

3. The stress wave sensor of claim 1, wherein the semiconductor element is configured to be mounted along an entire surface of the support such that stress waves that travel through the support distort the semiconductor element.

4. The stress wave sensor of claim 1, wherein the mounts of the support are located at ends of the support.

5. The stress wave sensor of claim 1, wherein the mounts of the support are configured to be attached to a component requiring stress wave sensing.

6. The stress wave sensor of claim 5, wherein the mounts of the support are configured to allow stress waves traveling through the component to also travel through the support.

7. The stress wave sensor of claim 1, wherein the circuit is configured to be mounted on a printed circuit board.

8. The stress wave sensor of claim 1, further comprising a connector configured to be coupled to the circuit and a plurality of control units.

9. A method of sensing stress waves within a component, the method comprising:
   providing a bendable support with one or more mounts;
   attaching a semiconductor element containing a plurality of piezoresistors, to the support, the plurality of piezoresistors including sensing piezoresistors and reference piezoresistors, each of the sensing piezoresistors having a non-strained impedance that is different than a non-strained impedance of each of the reference piezoresistors;
   connecting the support to the component with the mounts of the support; and
   sensing the impedance of the plurality of piezoresistors.

10. The method as claimed in claim 9, wherein attaching the semiconductor element comprises mounting the semiconductor element along an entire surface of the support such that stress waves traveling through the support distort the semiconductor element.

11. The method as claimed in claim 9, further comprising transmitting data from the piezoresistors to a control unit.

12. The method as claimed in claim 9, wherein the mounts of the support are located at ends of the support.

13. A system of sensing stress waves in a component, the system comprising:
   a support with one or more mounts and configured to be attached to the component;
   a plurality of piezoresistors each with input and output terminals, the plurality of piezoresistors including sensing piezoresistors and reference piezoresistors, each of the sensing piezoresistors having a non-strained impedance that is different than a non-strained impedance of each of the reference piezoresistors;
   a semiconductor element containing the plurality of piezoresistors and configured to be attached to the support between the mounts of the support; and
   a circuit capable of being coupled to input and output terminals of the plurality of piezoresistors and capable of sensing the impedance of the plurality of piezoresistors.

14. The system as claimed in claim 13, wherein the support is configured to receive stress waves traveling through the component.

15. The system as claimed in claim 13, wherein the semiconductor element is configured to be mounted along an entire surface of the support such that stress waves that travel through the support distort the semiconductor element.

16. The system as claimed in claim 13, wherein the circuit is configured to be mounted to a printed circuit board.

17. The system as claimed in claim 13, further comprising a connector configured to be directly coupled to the semiconductor element to transmit data to and from the semiconductor element without processing the data.

18. The system as claimed in claim 13, wherein the one or more mounts of the support are located at the ends of the support.

19. A sensor for sensing stress waves in a component, the sensor comprising:
   a flexible support having a first end and a second end, a longitudinal axis, a first support located proximate the first end, and a second support located proximate the second end;
   a semiconductor element containing a plurality of piezoresistors and mounted to the flexible support between the first and second supports; the plurality of piezoresistors including a first pair of sensing piezoresistors and a second pair of reference piezoresistors, each of the first pair of sensing piezoresistors having a non-strained impedance that is different than a non-strained impedance of each of the second pair of reference piezoresistors and a length that is greater than a length of each of the second pair of reference piezoresistors; the first pair of sensing piezoresistors located along and substantially parallel to the longitudinal axis of the flexible support; and a connector coupled to the semiconductor element so as to be able to receive a first signal derived from a second signal delivered to at least one of the plurality of piezoresistors.

20. A system of sensing stress waves in a component, the system comprising:
   a plurality of piezoresistors each with input and output terminals, the plurality of piezoresistors including sensing piezoresistors and references piezoresistors, each of the sensing piezoresistors having a non-strained impedance that is different than a non-strained impedance of each of the reference piezoresistors;
   a semiconductor support containing the plurality of the piezoresistors and one or more mounts and configured to be attached to the component;
   a circuit capable of being coupled to input and output terminals of the plurality of piezoresistors and capable of sensing the impedance of the plurality of piezoresistors.

21. The system as claimed in claim 20, wherein the semiconductor support is configured to receive stress waves traveling through the component.

22. The system as claimed in claim 20, wherein the circuit is configured to be mounted to a printed circuit board.

23. The system as claimed in claim 20, further comprising a connector configured to be directly coupled to the semiconductor element to transmit data to and from the semiconductor element without processing the data.

24. The system as claimed in claim 20, wherein the one or more mounts of the support are located at the ends of the support.

* * * * *